W. GÜNTHER.
PROCESS OF TREATING ORES.
APPLICATION FILED JAN. 21, 1911.
1,032,400.
Patented July 16, 1912.
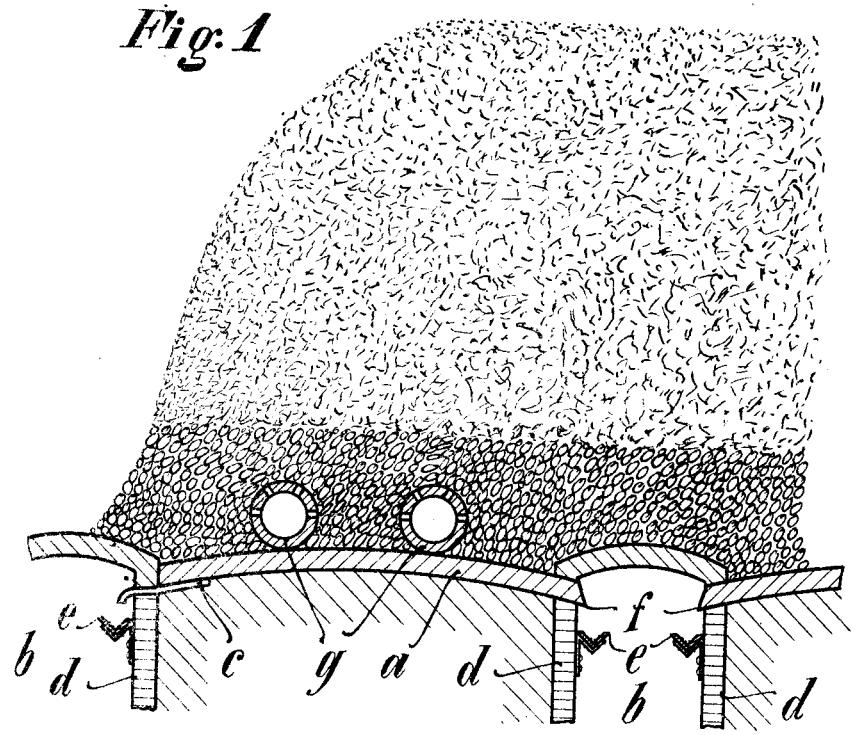
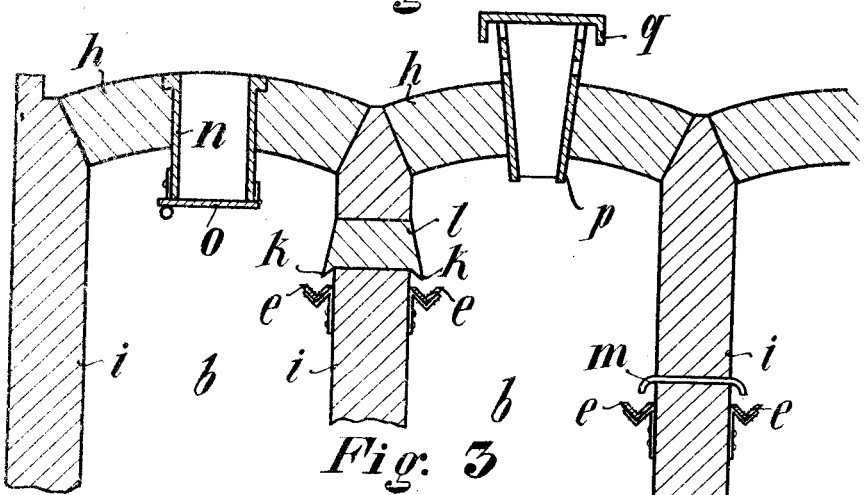
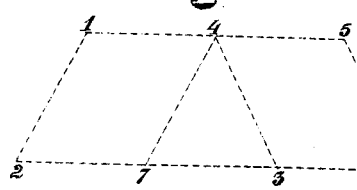
Witnesses:
Inventor:
Wilhelm Günther
by Paul E. Schilling,
his attorney

UNITED STATES PATENT OFFICE.

WILHELM GÜNTHER, OF CASSEL, GERMANY.

PROCESS OF TREATING ORES.

1,032,400.  Specification of Letters Patent.  Patented July 16, 1912.

Application filed January 21, 1911. Serial No. 603,937.

*To all whom it may concern:*

Be it known that I, WILHELM GÜNTHER, a subject of the German Emperor, and residing at Cassel, Germany, have invented certain new and useful Improvements in Processes of Treating Ores, of which the following is a specification.

My invention relates to processes and apparatus for extracting and lixiviating ores, metallic residues, and the like.

In known processes of extracting and lixiviating ores, metallic residues and the like, the defect is met with that the actions of chemicals and washing operations are confined to a very limited time, because the apparatuses which are used must be cleared for new raw material. In addition, the apparatuses are very small and contain at most one day's production. Therefore as many of these expensive vats are necessary as the number of days during which the treatment is continued, the time of charging and discharging being included. Many processes during the extraction of metal have heretofore necessitated various kinds of treatment, or repeated treatment of the same kind at long intervals, as *e. g.* in the cyanite process, in the case of rich ores, by means of several lyes, or according to American processes by means of repeated treatment with ammoniacal lye. This is also quite natural because the particles of ore in the rock are neither of the same kind nor equally large. But as only one definite quantity of solution contacts with each particle of ore, the lyes, gases, etc., *i. e.* the solvent, must be employed in excess, or a considerable agitation of the liquid, generally combined with movement of the masses of ore, will be carried out. But in spite of repeated treatment and washing large quantities of the substances intended to be extracted remain behind in their original form, partly because the chemical conversion is not completed owing to the shortness of the time, and partly for physical reasons. The accelerating influence of oxygen and also of oxidizing agents is mentioned in many patents, the finely disintegrated ore being brought into intimate contact, in open or closed vats, with air or gases. Among these known processes is one in which the ores are mixed with sulfuric acid and manganese and subsequently treated with air under pressure. As stated only very small quantities, say 10 to 20 tons, are exposed to the action in an acid solution in closed vats at a pressure of 2 to 6 atmospheres with about 10 to 15% manganic oxid calculated with regard to the ore. The atmospheric air and therefore the oxygen is limited by the admissible pressure. The quantity of this oxidizing agent is therefore very small. The apparatus is lined within with lead, fireclay or similar material, but, on the one hand, lead is rapidly dissolved or mechanically worn away by the mechanical friction of the lead sulfate which forms in the acid solution, and, on the other hand, fire-clay is pervious to lye, so that the iron under it is contacted by the lye and rapidly destroyed by the salts and acids therein contained. The process of conversion is said to be completed in time from 4 to 10 hours. It is necessary to disintegrate the ores very finely, this operation being very expensive and, in addition, the washing process becomes more difficult and more imperfect as the disintegration of the ores increases. Lyes are produced which contain much sulfate of iron and sulfate of manganese, and which are to be decomposed by the current.

By other processes the ores or the like are treated with or without solvents by means of the air or other gases. In these processes the mechanical power for the purpose of frequently moving the liquid, eventually with the ore, through the vats is very great. The utilization of oxygen in small vats is very small, whereas the wear and tear of the apparatuses is very great. In another process the ore is only moistened with the solvent, to wit, ammonia in solution, the excess of the solution running away. Air for oxidizing the pyrites is subsequently blown in. In the case of rich ores the process must be repeated several times. When the air is sucked through the water-discharge pipe, large quantities of air cannot pass through the same, and as compressed air is employed, a closed vat must be used. The finely powdered ore requires a good deal of mechanical work. When the air is blowed through, much ammonia is lost, and, in addition, much ammonia must be employed because all the sulfur is to be oxidized to form sulfuric acid and to be bound to ammonia. The basic precipitations, e. g. hydroxid of iron, are very voluminous and can be washed only with difficulty.

In none of these known processes is the necessary attention paid to the chemical and physical operations in the wet process of winning metals. Ores, products of foundries and so forth generally, and even those of the same origin, are more or less non-uniform, both in their chemical composition as also in their distribution in the gangue (admixtures), that is to say the extraction of one portion of the substance which is to be extracted is brought about more readily than that of another, and therefore those substances which can be converted more readily are first attacked by the chemical conversion, and for this reason those soluble with more difficulty meet constantly with less of the substances which are requisite for their conversion, and the complete dissolution is constantly retarded.

It is well-known that chemical reactions act most intensively by means of bodies *in statu nascendi*. This law has been made use of most completely only in my new process. Such reactions include those by which all the acids and salts which are formed during the process and participate in the further decomposition of the ores are obtained.

I will now explain processes, such as are represented by the hereinafter stated formulæ Nos. 4, 5, 6, 2 and 7, in their action for an optionally selected order by means of an example.

Hydrochloric acid and oxygen act in such manner on a particle of pyrites which contains several sulfureted metallic particles located beside one another that a metallic chlorid and sulfuric acid are formed. (See formula 4). Hydrochloric acid and oxygen had to be supplied in the aqueous solution to the sulfureted molecule of metal. The sulfate molecule which forms during the conversion is, however, precipitated in contact with another sulfureted metal molecule and brings about the ready oxidation of the same by absorbing oxygen. (Formula 5). If the metallic chlorid which forms is chlorid of copper, the same can at once be converted according to formula 6 with the adjacent sulfureted particle of metal, e. g. to cupric sulfid (CuS). If it is chlorid of iron ($FeCl_2$) on the contrary, and oxygen is absorbed, the reactions represented by the formulæ 2 or 7 may take place and so on. The particle of pyrites thus becomes constantly smaller owing to its solution and the removal of particles from its surface. The surface of the pyrites therefore remains pure and readily accessible for further decomposition, because the sulfur is caused by oxidation to dissolve. The larger the single particles of ore are, the more difficult their composition is, and the more they are surrounded by rock, the longer extends the period of extraction.

Many proposals have been made for shortening the time requisite for the lixiviation, but this time always depends on the size of the grain. The time is shortest when the disintegration is the finest, but just this causes the greatest difficulty for lixiviation and renders disintegration most expensive. It necessitates also the use of vats, and is consequently available only for working up small quantities at once. The working up of tailings and slimes, as it takes place in stamp-mills for the extraction of gold in vats of several hundred tons, takes place in vessels which must be called small as compared with the apparatuses of my new process which can simultaneously hold several hundred thousand to millions of tons of material for extraction.

The simultaneous treatment of enormous masses of material which my process renders practical is the prominent feature of my new invention. The larger the area on which the material to be treated is placed, the larger is the number of tons per square meter of area, i. e. the less are the costs per ton on the waterproof base or foundation. Supposing the height of the material is 30 meters and the area is large about 100 tons and more of material can be obtained per square meter, even when the specific weight of the material is but 2. All chemical reactions, in which oxygen is absorbed, take place with the emission of heat. This quantity of heat is not noticeable in small vessels or vats and therefore it has heretofore not been possible to use it. In the case of the enormous quantities of ore and the great height of the heaps of the same if the ore is heated by my method the path which the air has to traverse is long and the heat is completely absorbed by the surroundings, particularly as it cannot escape laterally. The air and the ore are constantly heated still more on the longer path along which the air travels. In order specially to retain this heat in the heaps, I provide that the direction of flow of the air is temporarily changed, so that air enters at the hottest part of the layers of ore and reheats those layers which have been blasted cold.

The importance of heat for chemical conversion (oxidation processes) even in aqueous solution is well known. But utilization of the arising heat in the process has not been possible heretofore and indirect heating has had to be employed. Almost all known wet processes were based on only one chemical process, such as is the case in the extraction of copper according to Siemens & Halske, Höpfmer, and others. In addition, no provision is made for the removal of the sulfur which is freed during this process and combines in its molecular state with the bodies in the lye. (Reconversion of metallic sulfids). The liberated sulfur has, however, particularly in its molecular state, the greatest tendency to combine with oxygen to form acids, and this takes place just owing to the great supply of air. The sulfur which prevents solution is not only liberated, but converted into substances, i. e. sulfurous and sulfuric acids, which assist the process.

No known process admits of working up such enormous quantities as my invention renders possible. The treatment of such large quantities is necessary, especially in the case of poor ores. In my process all manual work is avoided. Fresh ore is constantly dumped on the same ground, lixiviated in various stages, washed, and the ore liberated from metal is removed. This is only possible by using a very large watertight foundation, on which the ore lies. This foundation will be described in detail hereinafter. Not only is a large area necessary, but the dump must be upward of 10 to 30 meters in height in order that, on the one hand, as large a quantity of material as possible may rest on each square meter of foundation and, on the other hand, because only when there is a large quantity of ore can the favorable conditions of conversion, such as large development of heat, be obtained, and the frequent conversions of each particle of lye take place.

All the reactions characterized by the formulæ which are given hereinafter represent only single groups they are in reality much more varied. They may take place from the entrance into the dump to leaving the same. Moreover, the new bodies which are formed during the single reactions at once take part in the conversion and constantly exercise a solvent action on the particles of pyrites with which they meet, so that precisely in this manner a rapid destruction of all pyritiferous substance is obtained. Without oxidizing agents ferruginous lyes are formed. It is well known to liberate lyes from iron by blowing in air, but the process is carried out by itself in special vessels. The novelty in my present process is that all compounds of iron, both those supplied with the lye, and also those which form, are converted by the atmospheric oxygen alone, and this continuously through the entire mass. The transference of oxygen can be increased by oxidizers. Many oxidizing agents have been proposed but the same must be reconverted into their original form in a special process. In such a process oxid of manganese, for example, or similar oxidizing agents and sulfuric acid are added. The oxid of manganese is recovered by electrolysis. The part of the oxidizers and also of the transferrers of halogens is played by iron, copper and manganese salts and also by the salts of rarer metals, as e. g. those of cerium $$(2HCl+O=H_2O+2Cl).$$

Generally these bodies are already present in the ores, or the like, e. g. in copper, nickel, cobalt, silver and gold ore.

By my new process the lye from which metal has been won is always returned to the same ore or to new parts thereof. Therefore there are no losses, and after the precipitation of one or more metals the remaining constituents, which are almost always lost otherwise, are concentrated in the lyes. These enriched lyes are separated and treated by themselves for obtaining all the metals in them. In the case of copper ore, copper, silver and gold for example they are first extracted and won, while nickel, cobalt, zinc, tin and also the rare metals, which are present only in small quantities, become so enriched in the lyes that further working up pays only after a longer time.

Owing to the concentration of the lyes due to the evaporation of water during the extraction, the process can be so conducted that sulfates, chlorids, and so on are directly obtained of such concentration that they can be successfully worked up to salts, as in the case of foreign ores in dry districts where fuel is expensive. The salts here play the part of stone in the smelting process. Most smelting products and ores, particularly those out of the lower strata in the earth, contain sulfur in excess. To oxidic ores and smelting products, which do not contain the quantity of sulfur requisite for the formation of sulfates, must be added, the lacking quantity of sulfur in the form of ores containing much sulfur, or of sulfur compounds, such as sulfurous or sulfuric acid. The sulfur is necessary not only for converting the pyrites into metallic salts, but also for binding the bases, as well as those put into the lyes, e. g. sodium chlorid, calcium chlorid, as also those present in the ore, chiefly lime. Ores rich in lime therefore requires more sulfur, for converting the same into gypsum, than those poor in lime. The addition of sulfur, such as has been employed in ore-roasting processes, was for other purposes.

In the above the advantages of my new process may have been sufficiently emphasized, but they are by no means thereby exhausted. The enormous quantities of the poorest ores which have heretofore lain untouched, and the dumps, and the like, can now be worked up at a profit, and mingled ores and rich ores can all be worked up in any district. In districts without fuel and without reducing agents the ore can be powdered in such manner that only the metallic salts are won and conveyed to a distance to be further worked up. The cost of transport from the place of winning to the place of working up will be reduced to a minimum, because suitable areas for the watertight foundation can always be obtained cheaply near at hand. No losses of metal or solvent occur. The cost of the lixiviation proper is exceedingly small, the apparatus durable and simple, and the extra output as compared with the former output will pay for the entire plant. Manual labor is completely done away with. It is possible at any time to check the course of the chemical processes. When working day and night at the extraction of the metals it is necessary to procure the ore only during the day. In the case of a small or temporarily interrupted supply of ore no disturbance occurs in the use of the lye and in the winning of metal connected therewith. I may mention one additional point which does not relate to the winning of metal itself, but is connected with the innocuousness of my process. Injurious smoke-gases and also waste lye are entirely lacking in my new mode of winning metals; the former lead to serious complaints both as regards their influence on human beings and on the vegetable world, and the waste lyes are mostly valueless, but in order that they may be conducted into rivers they have to undergo an expensive chemical treatment, e. g. precipitation of iron with lime, nevertheless they always remain a very injurious constituent of the streams, causing the destruction of animals.

My invention relates to a process of extracting metals from ore and other smelting products, and of treating all other bodies, in which compounds soluble in lyes are formed with or without the influence of gases by the action of acids and salts, and particularly consists in moistening the material, which is to be treated, and is arranged in heaps, with lyes and introducing into the same a current of compress gas which brings about the decomposition of the raw materials. The lyes which flow away may first be utilized repeatedly and are finally worked up.

The apparatus requisite for carrying my process into practice can be constructed very simply. As it is not necessary completely to cover the raw materials with lyes, side walls are necessary only in so far as they are required for preventing the raw materials from slipping. The foundations or bottoms, on which the raw materials are heaped, are so constructed that, on the one hand, it is possible to supply the suitable gases and, on the other hand, the lye which is obtained can readily run off. It is to be particularly emphasized that no change of apparatus is requisite. Consequently, very large quantities of raw material can be simultaneously worked up in the single apparatuses in the corresponding devices. By these means space and time are saved, and the distance of conveyance is shortened, whereas in the old processes which are carried into practice in only small apparatuses, the costs are very heavy.

In many instances it will be preferable to dry and to heat the crude materials before their treatment with gases, etc., in order that the lyes may intimately unite with, i. e. penetrate undiluted into, the crude materials. Afterward heating per se will always be brought about by great absorption of oxygen when air is blown in and, finally, after stopping the supply of lye, the development of heat can be suitably increased in the dump itself in order to promote conversion. Owing to the heat the lye is concentrated by means of the evaporation of water which takes place, but iron is simultaneously precipitated and acid separated.

Some forms of apparatus suitable for carrying my process into practice are diagrammatically represented by way of example in the accompanying drawing, wherein:—

Figure 1 is a vertical section showing part of a dump of raw material on a suitable foundation, Fig. 2 is a like view, enlarged, through a foundation alone while Fig. 3 is a diagram.

The raw material which is to be treated is dumped in a large heap on a waterproof foundation made in any desired suitable manner. The larger the area of the foundation is and the steeper the angle of slope of the material can be obtained, the greater will be the number of tons of the raw material per square meter of foundation. The diagram Fig. 3 shows the change in volume of the dump. After a heap of material 1, 2, 3, 4 has been dumped onto one part of this foundation, the extraction can be at once commenced, while fresh material is constantly dumped at the side 3, 4. The lye which flows away from the heap 1, 2, 3, 4 and from which the metal has been removed can afterward be put onto the newly dumped heap 3, 4, 5, 6, so that the metal not precipitated from the lye, travels in the direction of the dump. When the chemical changes in the heap 1, 2, 3, 4 are finished, washing water is supplied, which is subsequently conducted to the next heap or field 3, 4, 5, 6, while a new field at 5, 6 is dumped in the meantime which receives the lye from the previous one. While the dump constantly increases in the direction of the side at which fresh material is dumped, as much washed ore can be removed from the heap 1, 2, 4, 7, e. g. as gobbin, as the angle of slope up to the top face 1, 4 admits It is clear that when the area of the foundation is sufficiently large constant dumping, lixiviation, washing and removal of the worked up ores are possible on the same bottom. The lixiviation process in one and the same vat, as was employed heretofore, did not admit of the simultaneous operations of filling, lixiviation, and so on.

The foundation or bottom in itself may be constructed as desired. The constructional forms represented in the drawing will be hereinafter described, but the scope of the invention is not limited to these forms. It is only necessary to arrange the foundation so that one can at any time go under the bottom, in order on the one hand to supply gases and, on the other hand, to be able to observe the chemical processes in the materials. The materials from which metals are to be extracted are moistened with a suitable extraction liquid. This operation is however performed only in such manner that the masses acquire a certain degree of moisture, i. e. they are not completely covered by the liquid. The liquid itself is supplied by means of one or more distributers over the heap which is to be treated and may be so supplied either continuously or intermittently. All organic and inorganic acids and their salts may be employed as extraction liquids. It is not absolutely necessary that the selected acids and salts give off oxygen, but the latter may be supplied or added under certain circumstances.

In order that the lye may penetrate as thoroughly as possible into the raw material, the latter may be dried and heated before the liquids are supplied thereto. If the lye, which may likewise be preliminarily heated, is added in mixing-vats to the raw material, while the lyes are concentrated they simultaneously penetrate deeply into the cavities and pores of the raw material. This process is particularly suitable when the raw materials are very moist or when only thin lyes are at disposal.

Gases are introduced under pressure into the preliminarily prepared heaped up raw material. The selection of the gases and the modes of their introduction depend on the intended purpose of the extraction and on the raw materials. Air, oxygen, sulfurous acid, chlorin, hydrochloric acid gases, carbon dioxid, ammonia, sulfureted hydrogen may be blown in either cold or hot.

The lyes which collect on the bottom may be conducted away in gutters or in other suitable manner. I prefer to divide the bottom into definite fields and so to slope the faces thereof that the lyes from the single fields can be conducted away separately, so that I can judge accordingly of the chemical processes in the part of the dump carried by the field in question. The various effluents of the gutters may be united as desired one with another, and the lyes obtained may either be worked up at once or be returned to the dump, so that e. g. the lye from field 1—3 is supplied to the material on field 4—6, and lye flowing from the latter is supplied to the next adjoining field. Instead of the gutters I could also arrange drains or conduits in order to be able to draw off the liquid from the fields to the arches the individual fields for the separate collection of the lyes thereby are diminished, because the entire field, instead of having one gutter, as it had only one outflow, will now have a plurality of them.

In the constructional form of my foundation shown in Fig. 1, the watertight bottom or surface $a$ is constructed directly on the ground by means of concrete, asphalt, or pavement having watertight joints. It may of course consist of wood, metal, stone slabs, or the like, its composition being solely dependent on the circumstance that it must not be able to be destroyed by the lye. Under or adjacent the bottom $a$ are passageways or tunnels $b$ which as mentioned above, not only serve for supplying gases, for testing the chemical processes and for conducting away the lye, but, if desired, also for removing the residues after the treatment. These tunnels or passages must of course each be covered by a watertight roof, and the connection of the bottom $a$ with these roofs must be such that no large quantity of the lye can penetrate. In the form represented in Fig. 1 it is assumed at the left-hand side that under the bottom $a$ a layer $c$ of insulation is arranged which passes through the wall of the tunnel $b$ and projects a short distance into the latter, so that the drops of lye can be conducted away in a gutter $e$. At the right-hand of Fig. 1 the bottom $a$ is itself continued into the walls $d$ of the tunnel $b$ and has therein an edge $f$, from which the lye drops into a gutter $e$. In the form shown in Fig. 1 pipes $g$ laid on the bottom $a$ are provided for supplying the gases. The gases may however be supplied, as described hereinafter, through the tunnels $b$.

My foundation shown in Fig. 2 comprises arches $h$ resting on longitudinal walls or pillars $i$. The joints between the arch and the walls are made tight by means of cement, asphalt or the like, or a layer of insulation which is impervious and resisting to lyes is provided in the walls. When material impervious to water is used for the masonry, the joints must also be watertight, when the lyes are, of course, compelled to flow along the surfaces of the walls. The lyes are then conducted away either at projections $k$ located immediately below a layer of insulatoin $l$, as the central pillar in Fig. 2 shows, or as shown at the right-hand of Fig. 2, a layer of insulation $m$ is provided at any other suitable place in the masonry, projects toward both sides and conducts the dropping lye, as in the form above described, into gutters $e$. In the case of these arches the entire bottom is automatically divided into separate fields.

The left-hand arch in Fig. 2 comprises a device which, for example, may be used for removing the residues. In the top of the arch is provided a suitably shaped outlet $n$ which is closed watertight below in suitable manner by a bottom $o$. When the residues are to be removed, the bottom $o$ is opened and the material falls through the shaft $n$ into the tunnel or passage $b$ and into dump-cars or the like.

Gases can be supplied in the manner illustrated at the right-hand of Fig. 2. A casing $p$, with which the gas-pipe is connected, is provided in the right-hand arch $h$. This casing $p$ projects beyond the arch and is preferably provided with a cover $q$ for preventing the entrance of lye and raw materials. This device may be so arranged that it can be fitted in from below into the outlet $n$.

It remains to be mentioned, in addition, that the bottom $a$ may slope toward one or more sides in order to facilitate the flowing away of the lyes and that it may in every respect adapt itself to the conditions of the ground.

The requisite pressure of the gases is produced by a fan or the like.

As already mentioned, not only all possible ores and smelting products, as well as metallic residues can be treated according to my above described process but also all other bodies, in the case of which compounds soluble in lyes are formed by the action of acids and salts, with or without the influence of gases, as e. g. aluminium sulfate from substances containing pyrites and aluminia, or sulfureted hydrogen from calcium sulfate and carbon dioxid.

The chemical dissolving and decomposing agents can be selected either with the view of recovering simultaneously all the constituents which are to be extracted, e. g. in the case of copper ore, the gold, silver, nickel, etc., contained in the form of chlorids in sodium chlorid lyes, or only a part of the same, e. g. in the case of the same ore, as sulfates, when gold will remain behind unchanged and can be obtained in a subsequent treatment as chlorid or cyanid. Also, a chemical action may be produced on a body to be obtained subsequently, e. g. formation of chlorid of silver. The solvent will however then intentionally be so selected, e. g. without much admixture of sodium chlorid, that these bodies for the most part remain behind, in order to be extracted with a new solvent, e. g. thiosulfate, only after the other salts have been washed out. It is moreover absolutely impossible sharply to separate the two methods, because on the one hand chemically pure substances are not worked with and, on the other hand, even the unattacked metals and compounds in the lyes which are employed are soluble only to a limited extent.

Some formulæ will now be given in order to characterize the chemical changes during the process. It is however to be noted that of the innumerable chemical reactions which take place during my many-sided process only a few and for the most part only the final products are mentioned.

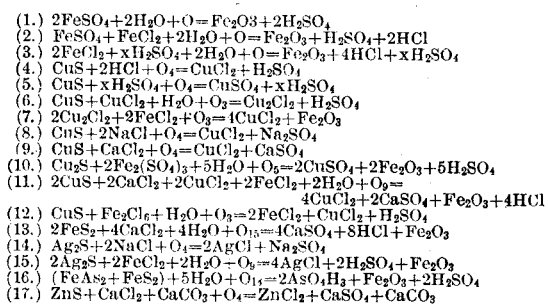

(1.) $2FeSO_4+2H_2O+O=Fe_2O_3+2H_2SO_4$
(2.) $FeSO_4+FeCl_2+2H_2O+O=Fe_2O_3+H_2SO_4+2HCl$
(3.) $2FeCl_2+xH_2SO_4+2H_2O+O=Fe_2O_3+4HCl+xH_2SO_4$
(4.) $CuS+2HCl+O_4=CuCl_2+H_2SO_4$
(5.) $CuS+xH_2SO_4+O_4=CuSO_4+xH_2SO_4$
(6.) $CuS+CuCl_2+H_2O+O_3=Cu_2Cl_2+H_2SO_4$
(7.) $2Cu_2Cl_2+2FeCl_2+O_3=4CuCl_2+Fe_2O_3$
(8.) $CuS+2NaCl+O_4=CuCl_2+Na_2SO_4$
(9.) $CuS+CaCl_2+O_4=CuCl_2+CaSO_4$
(10.) $Cu_2S+2Fe_2(SO_4)_3+5H_2O+O_5=2CuSO_4+2Fe_2O_3+5H_2SO_4$
(11.) $2CuS+2CaCl_2+2CuCl_2+2FeCl_2+2H_2O+O_9=$
$4CuCl_2+2CaSO_4+Fe_2O_3+4HCl$
(12.) $CuS+Fe_2Cl_6+H_2O+O_3=2FeCl_2+CuCl_2+H_2SO_4$
(13.) $2FeS_2+4CaCl_2+4H_2O+O_{15}=4CaSO_4+8HCl+Fe_2O_3$
(14.) $Ag_2S+2NaCl+O_4=2AgCl+Na_2SO_4$
(15.) $2Ag_2S+2FeCl_2+2H_2O+O_9=4AgCl+2H_2SO_4+Fe_2O_3$
(16.) $(FeAs_2+FeS_2)+5H_2O+O_{15}=2AsO_4H_3+Fe_2O_3+2H_2SO_4$
(17.) $ZnS+CaCl_2+CaCO_3+O_4=ZnCl_2+CaSO_4+CaCO_3$

From these formulæ it is clear that oxygen plays a very important part in the recovery of metals by a wet process. It is preferable to obtain the oxygen directly from the air, when provision must be made that the air which is poor in oxygen is rapidly removed from the heaped up mass. This is preferably brought about either by blasting fresh air into the dump or by sucking the consumed air out of the same. It follows, further from the great absorption of oxygen that the mass must become highly heated. This generation of heat in the dump, however, causes, together with the air blown through, the lyes to be concentrated owing to the water contained in them being evaporated. In order to obtain uniform heating it is preferable occasionally to suck the air out of the dump in order in this manner to expose to the treatment with hot air the lowest layers of ore which remain or become cold in consequence of the evaporation of water, or to heat such layers. When the percentage of sulfur in the ores is sufficient, after stopping the supply of lye the temperature in the heaps can be suitably increased and in this manner other chemical changes of the salts and ores can be brought about.

Many salts and bodies have the property of acting as transferrers of oxygen and halogens. To these belong the compounds of iron which are almost always present, those of copper, etc., and also those of various so-called rare metals. But when such transferrers of oxygen and halogens are not present the same may be added in any desired form which, in the case of expensive substances, will be so selected that they are not precipitated in the later stages of the process, or can be readily recovered. Likewise the percentage of iron in the lyes which are used can be regulated as desired. The greater the percentage of sulfur in the ores is, the greater must be the quantity of air to be supplied and the more acid will be the lyes. The more basic the ores are, the less will, however, of course, be the percentage of acid. The percentage of iron in the lyes will depend on the percentage of sulfids containing iron in the raw materials, on the stage of the action on the ores, and on the supply of air. When little air is supplied and when there is still much non-decomposed sulfid the percentage of iron sulfate will increase, but it will decrease when there are but few sulfids and a large supply of air. Therefore the percentage of iron in the lyes which have to be worked up can be regulated as desired. If the percentage of sulfur in the raw materials is too small for binding the bases, pyrites may be added even in the dump, or an admixture of any desired sulfates of iron may be added to the lye, or the sulfur may be blown in as a gaseous compound in the form of sulfurous acid or sulfureted hydrogen with air. By conducting the acid lyes over fresh basic ores or by admixing basic materials with the ore, the percentage of free sulfuric acid can be regulated. The percentage of chlorin in the lyes at first and at the end of the treatment will vary only little, when the percentage or water is equal, owing to the precipitation of chlorid compounds which are soluble with difficulty.

In the well-known extraction processes sulfur, which acts physically and chemically obstructively on the further decomposition of the particles of ore located under it, is separated from the ores. The conversion of the entire part of the ore in question can be brought about much more rapidly and more completely when the electronegative body is completely removed or, better, is converted into a suitable compound, e. g. sulfuric acid or sulfurous acid, especially as the heat of combustion aids the chemical reaction. Sintering and protection from further decomposition, as in the ore-roasting process, particularly when sulfate of lead is formed or when the ore is otherwise readily converted into slag, is quite impossible.

The lyes which are obtained can be worked up to salts or metals in the most various ways. When precipitating, all well-known agents may be employed. For example, copper may be precipitated by iron, and then the iron lye liberated from copper may be returned again to the ore where ferric oxid is precipitated by the air, while the acid radical has a solvent action again. When the metal is precipitated by electrolysis the residue of acid may either be bound to salt or remain as free acid in solution. During the working up of solutions of metallic chlorids in the presence of iron salts there must be present in order to obtain as much metal as possible so much iron salts that the chlorin can be obsorbed by the same, e. g.

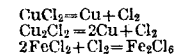

It is preferable that the precipitants selected are such that lyes are produced which are converted again with the ore in the dump. The conversion in the dump of one molecule of solvent, e. g. $CuCl_2$ is not a single conversion, but a constant regeneration takes place, so that molecules having a decomposing action are produced not merely by new formation, but also by regeneration, so that the same are greatly increased, e. g.

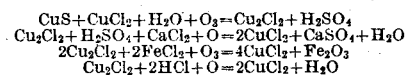

In order that the invention may be clearly understood, three examples, which have been selected at random, of carrying my process into practice will now be given. They relate to working up copper ore, gold ore and mixed ore.

*Example 1. An occurrence of copper, when the metal for the most part occurs as sulfid and the gangue for the most part consists of silicic acid, e. g. the occurrence in Marsberg, (copper-schist.)*—It does not pay to dress this ore on account of the fine distribution of the particles of ore. For other occurrences of ores having coarser pieces, the dressing is not carried so far that grains of about 2 to 5 millimeters in diameter are won, while the whole of the remaining products are worked up together, a size of grain being chosen which guarantees the particles of metal in the ore being completely exposed. The dressing can be entirely omitted. The disintegrated ore as well as the powdered intermediate products and waste are dumped upward of 10 to 30 meters high on the described watertight bottom or foundation. For starting the conversion of the pyrites, the acids or the salts of the acids in question are supplied from above in solution, and likewise, subsequently, the liquid in question for washing out the lyes. In the present instance I assume that all the metals which can be employed are to be won. Copper, silver and gold principally come into consideration. As solvents, hydrochloric acid, magnesium chlorid, calcium chlorid and sodium chlorid principally come into consideration. After these have been supplied, and after they have completely penetrated the dumped ore down to the watertight bottom, air is blown through the dump, when decomposition intensively takes place in the dump. The quantity of air is dependent on the metallic sulfids in the dump, their oxidizability and the existing temperature. The latter can readily be measured in the top layers of the dump.

Owing to the rise in temperature occurring during the oxidation the entire dump is heated from below upward and most highly in the upper layers, because the oxygen acts more intensively in the heated layers. Now in order fully to utilize this heat and also to heat the lower layers of ore, the current of air is reversed, that is to say air is sucked away from below. Owing to the slow movement of the liquid lye heated in the upper layers downward and to the air heated in the same layers, the lower layers of ore are heated and therefore greater oxidation takes place in these also owing to the oxygen of the air. When the temperature has been raised sufficiently, the supply of air at the fan is again reversed and changed from suction to pressure. If any sources of heat, such as smoke-gases, exhaust steam and so on are at disposal these may be used for heating the air.

While the lyes run through the dump, owing both to the action of the oxygen of the air on the pyrites, the conversion with the lyes, e. g. separation of gypsum, and to the action of oxygen on the lyes, e. g. precipitation of iron, the metals to be extracted are enriched in the solution. The lyes are concentrated, in addition, owing to the evaporation of water. In this special instance, i. e. in Marsberg, chlorids are to be employed in the dump. Heretofore only hydrochloric acid was employed there, which when absorbed by the ore, first attacked the carbonates and oxids, forming the corresponding chlorids, and only subsequently underwent a slow conversion with the pyrites. The chlorid lyes liberated from the metal were conducted, possibly after the iron had been previously precipitated, into the rivers and were lost. According to my new process hydrochloric acid can also be employed. The cheaper substances, such as sodium chlorid, calcium chlorid, magnesium chlorid, ferric chlorid, etc., are likewise used, that is to say the already used lyes which are obtained can constantly be used again. The pyrites form with the oxygen of the air the corresponding sulfates, and these are so converted by the other substances in the lyes that the metallic chlorids become enriched in the solution, while principally the calcium present both in the ore and in the lyes combines with the sulfuric acid to form gypsum which is soluble with difficulty. After the conversion of the lime in the rock the lyes become more acid. The iron of the iron sulfate which forms has sufficient opportunity to be separated again by oxidation. Non-ferruginous metallic lyes are thereby formed simultaneously as the ore is extracted without the lyes having to be treated by themselves with air for removing the iron.

*Example 2. Treatment of pure gold ore, e. g. occurrence in the Transvaal.*—The disintegrated ores are dumped in large heaps on the watertight bottom, possibly with an admixture of as much burned lime as is necessary for binding the acids which possibly form, whereupon calcium cyanid lye is supplied simultaneously with air. The gold is removed from the lye which flows away as heretofore. The dump can remain for a much longer time than heretofore, because a large quantity of ore lies on one square meter of bottom when the dump is 30 meters high. Owing to the longer time for conversion and lixiviation the content of gold is completely extracted. Owing to the enormous quantities of ores worked up in the Transvaal each extra one-tenth of a gram of gold per ton plays an enormously important part, because in the case of 100,000 tons of ore one-tenth of a gram per ton means an extra output of 10,000 grams, equal in value to about 7750 dollars. The ore does not require to be powdered as finely as heretofore and the process is thereby also cheapened. Therefore, even less rich ores which were not paying heretofore can be worked and worked up with advantage.

*Example 3. Mixed ores containing gold, silver, copper, nickel, zinc, arsenic, etc.*—By treating these ores only with water and air to which the gases formed by the roasting process may be added (roasting pure ores separated by hand or by dressing), the sulfates of the metals are formed from the sulfids, gold and platinum not being attacked but liberated. The lyes deprived of the metals are returned to the dump until the conversion and lixiviation have been effected. In the subsequent process the noble metals are dissolved by cyanid of potassium and won by themselves. If chlorids are added at once to the lyes, during the conversion, most of the metals are dissolved as metallic chlorids. Silver chlorid which is separated can simultaneously be dissolved by increasing the percentage of sodium chlorid. The same may, however, be extracted during a subsequent washing operation by a solvent, e. g. thiosulfate of sodium.

I claim:—

1. The process of treating ores, metallic residues and the like, consisting in distributing the raw material in large heaps over a liquid-tight surface, and subjecting it to the action of lyes and gases, substantially as and for the purpose set forth.

2. The process for treating ores, and the like, consisting in scattering the raw material over a liquid-tight surface, treating it with lyes and gases, and periodically withdarwing the air from the lower part of the material, substantially as and for the purpose set forth.

3. The process of treating ores and the like, consisting in first drying and heating the raw material, and then subjecting it on a liquid-tight surface to the action of lyes and gases, substantially as and for the purpose set forth.

4. The process of treating ores and the like, consisting in introducing into the raw material by means of an air blast suitable media for enhancing the proportion of sulfur in the mass, and then treating the mass on a liquid-tight surface, substantially as set forth.

5. Means for treating ores and the like, comprising the combination of a fluid-tight surface with passages for introducing gas, for drawing off the lye, for watching the chemical processes, for removing the residues, and for like purposes, substantially as set forth.

6. Means for treating ores and the like, comprising the combination of a liquid-tight surface composed of a plurality of sections, each section sloping toward the edges, with means for separately conducting away the lye from the several sections, and means in connection with each section for watching the chemical processes, for removing the residua, for introducing required operating media, and for like purposes, substantially as set forth.

7. Means for treating ores and the like, comprising in combination a liquid-tight surface, tunnels, shafts extending from the latter through said surface, lye drips in said tunnels, means for conducting the lye from the top of said surface to said drips, and gas conduits, substantially as set forth.

In testimony whereof I affix my signature in presence of two witnesses.

WILHELM GÜNTHER.

Witnesses:
ADOLF SCHMIDT,
ERNST MEIER.